INVENTOR.
HENRY SCHOTTLER

June 28, 1955     H. SCHOTTLER     2,711,655

BALL BEARING SCREW DEVICE

Filed May 13, 1954     2 Sheets-Sheet 2

INVENTOR

HENRY SCHOTTLER

By G. Hochwald
AGENT

United States Patent Office 2,711,655
Patented June 28, 1955

2,711,655

BALL BEARING SCREW DEVICE

Henry Schottler, Houston, Tex., assignor, by mesne assignments, to Roller Gear Company, Inc., a corporation of New York Application May 13, 1954, Serial No. 429,590

5 Claims. (Cl. 74—459)

The invention relates to a screw device of the ball bearing type and is particularly adapted for use as a variable pressure generating means for friction drives, where the generated pressure corresponds to the torque to be transmitted.

A device of this type has been disclosed in my copending patent application, Ser. No. 339,015, filed February 26, 1953. It comprises an inner member provided with a helical thread or track, a concentric outer member provided with a complementary helical thread or track, both members being independently rotatable and slidable relative to each other. In the path formed by the tracks, balls are inserted for free rolling motion which transmit axial pressure from the one to the other of said members. To prevent any otherwise possible slipping of the balls along this path, a ball controlling cage is arranged between inner and outer members and operatively connected to both said members so that its angular displacement corresponds to the angular displacement of the freely rolling balls. This controlling cage has, therefore, to be provided not only with positive means for operative connection with the inner and the outer member, but also with separate means to engage directly the balls for controlling their angular displacement without interferring with their axial displacement. This causes certain difficulties in the manufacture of such a cage, which, for accurate functioning, has to be held to close tolerances. In the cage types illustrated in Figs. 1–13 of my copending patent application, it is somewhat difficult to secure a uniform transfer of the rolling movement from one ball to the next all around the path of the balls, while the cage type illustrated in Figs. 14 and 15 requires elongated openings for the balls, thus complicating both machining and assembling the cage.

A principal object of the invention is to eliminate certain drawbacks of the recited cage design, and to improve the operation and reduce the manufacturing cost of the ball bearing screw disclosed and claimed in my copending patent application, Serial No. 339,015.

This is accomplished by dividing the controlling cage into two separate elements, the first of which guides only the balls, while the second is operatively connected to the inner and outer member of the device and simultaneously to the first cage element so as to impart to it the correct angular displacement corresponding to the angular displacement of the free rolling balls without interfering with its axial displacement.

The first controlling element which guides the balls directly is shaped as a tubular sleeve with spaced holes for the balls arranged in a helix corresponding to the helix of the ball track.

The second controlling element is arranged as a circular segment, concentric to the ball cage, and is coupled thereto for rotation but independent for axial displacement. Said second controlling element is provided with means engaging relatively to each other inclined abutting surfaces of the inner and outer member of the screw device so as to govern its movement in correspondence to the displacement of said inner and outer members. The second controlling element may be divided in two symmetrical separate parts, either of which is linked to the inner and outer member, respectively, and simultaneously to the ball controlling cage by identical means.

In the following detailed description, two embodiments of my invention will be set forth and illustrated in the accompanying drawings, in which.

Figure 2:
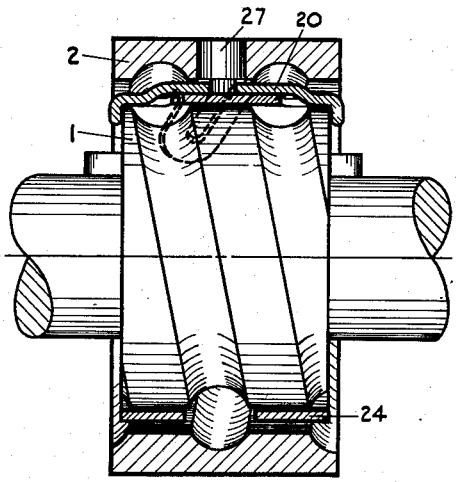
Figs. 2 to 10 illustrate another embodiment of the invention with a one-part undivided controlling element for ball cage, namely.
Figure 5:
Figure 6:
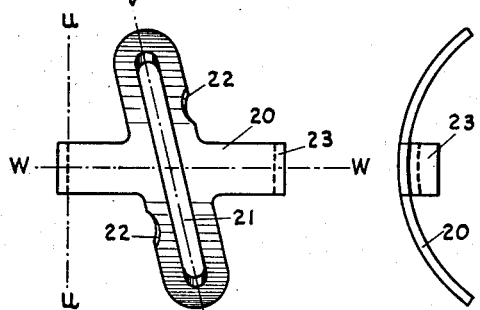
Figure 7:
Figure 3:
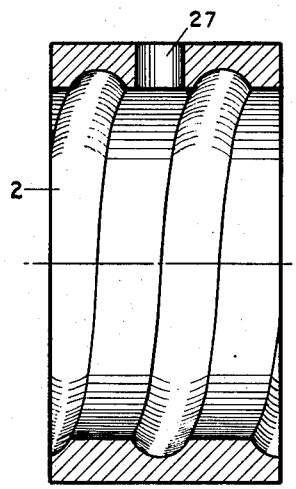
Figure 8:
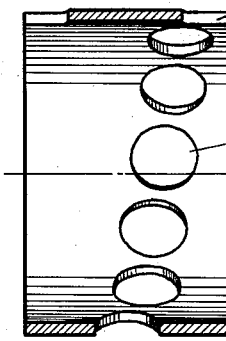
Figure 10:
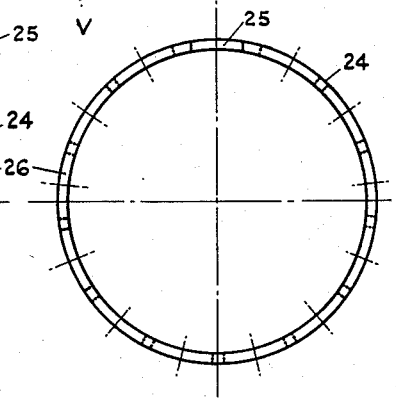
Figure 4:
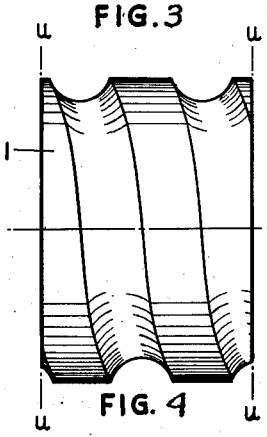
Figure 9:
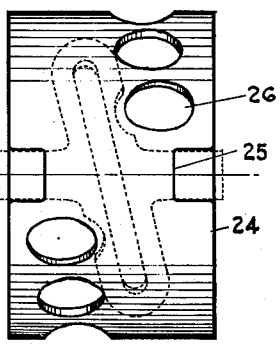

Fig. 2 an axial section of the assembled screw device,

Fig. 3 the outer member with its helical track,

Fig. 4 the corresponding inner track member,

Fig. 5 a cross section; Fig. 6 a plan view, and Fig. 7 a side view of the one-part controlling element;

Figs. 8–10 show the ball retaining cage, respectively, in axial section, in plan view with the controlling element in dashed lines, and in side view.

Figure 1:
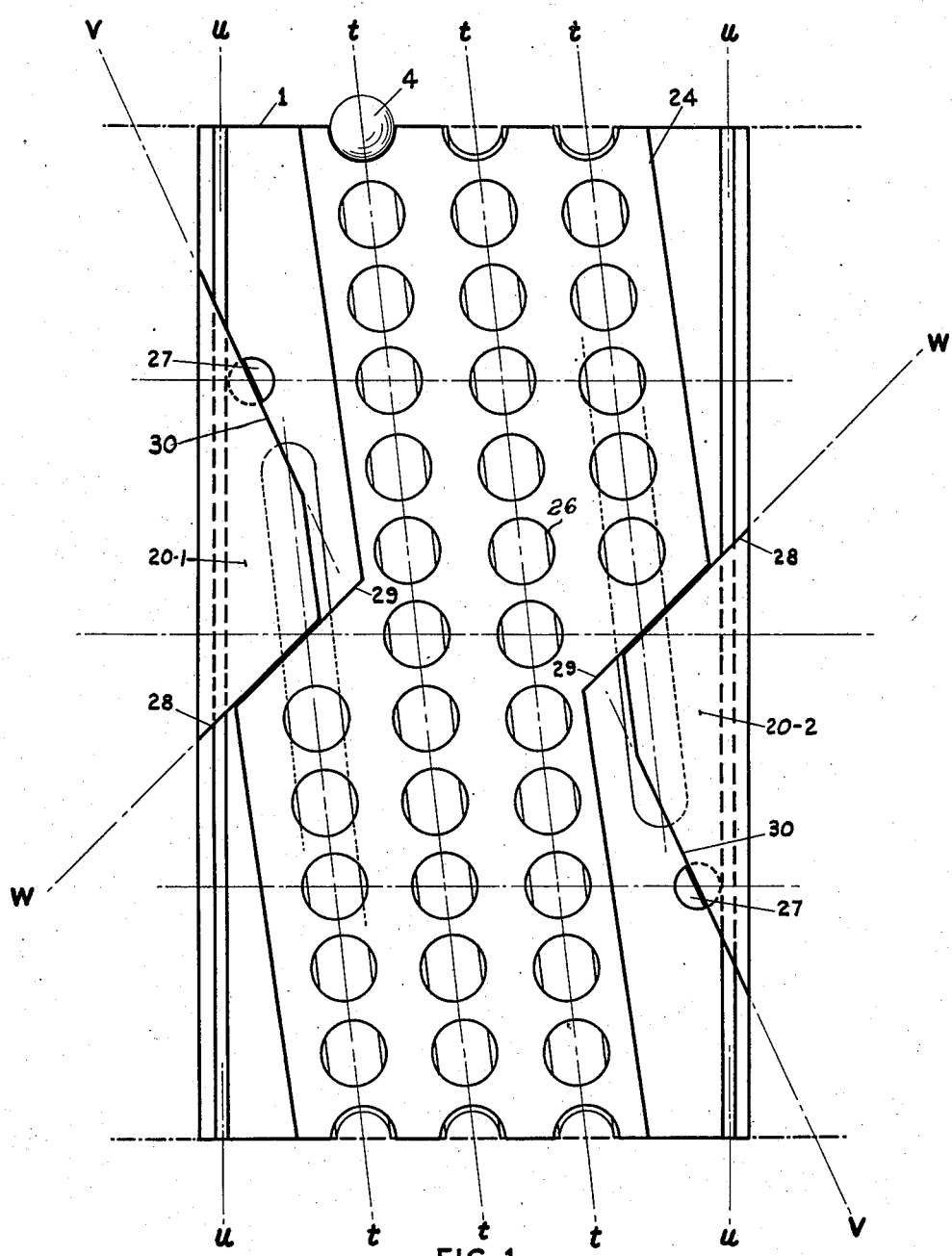
Fig. 1 shows in a developmental view one embodiment of the invention, in which the controlling element for the ball cage is divided into two separate symmetrical parts.

The controlling element of Fig. 1 is divided into two parts 20–1 and 20–2 which are operatively connected to cage 24 containing spaced holes 26 for the track engaging balls 4. The centers of these holes are aligned in a helix coinciding with the helix of the ball tracks. Controlling elements 20–1 and 20–2 are freely rotatable but not axially displaceable with respect to the inner track member 1 by means of interengaging peripheral ribs and grooves. Pins 27, rigidly connected to outer track member 2, slide along inclined edges 30 of the controlling elements or guiding pieces 20–1, 20–2, respectively, and determine for each position of members 1 and 2 the corresponding position of these guiding pieces.

The inclined edges 28 of the guiding pieces abut against corresponding edges of ball cage 24 and determine its angular displacement without interfering with its axial displacement.

The embodiment of Figs. 2–10 is a screw device with a single undivided controlling element 20. Element 20 has angular end bends 23 which overlie the outer edges of track member 1. It can therefore freely rotate about it but is axially secured thereto.

Ball cage 24 has two cutouts or recesses 25 engaged by the end bends 23 so that it is rotatably coupled to controlling element 20 but axially freely shiftable relative to it.

The operative connection between outer track member 2 and controlling element 20 comprises a pin 27 rigidly fastened to track member 2 and engaging, preferably with a flattened protrusion, an appropriately inclined slot 21 of controlling element 20.

Recesses 22 of the element or guide piece 20 prevent interference of the balls with the outer longitudinal edges of said elements.

The function of the device is as follows:

When track member 2 is displaced relatively to track member 1, balls 4 roll freely in their tracks and displace cage 24 correspondingly, the controlling element 20 rotates with the ball cage 24 but does not shift axially with it. At the same time, pin 27 of track member 2 rides along inclined slot 21 of element 20.

From the foregoing, it follows that the helix angle for the ball tracks and the angles of the slot and guiding edges of element 20 have the same relationship to each other as illustrated in Fig. 17 of my copending patent application, Ser. No. 339,105.

I claim:

1. In a ball bearing screw device, a helically threaded inner member, a complementary helically threaded outer member, said members being displaceable to each other in peripheral and axial direction, thrust transmitting balls arranged in the path formed by the helical threads, and means to secure the free and slipless rolling motion of the balls in their path, said means comprising a ball cage between inner and outer member arranged for free axial and peripheral displacement, and an independent controlling element for said cage operatively connected to said cage as well as to the inner and the outer member of the screw device, respectively.

2. A ball bearing screw device as set forth in claim 1, wherein said ball cage is formed as a sleeve concentrically arranged between the inner and the outer member and provided with spaced holes for the balls, the centers of said holes being aligned in a helix coinciding with the helix of the ball track.

3. A ball bearing screw device according to claim 1, wherein said controlling element is concentrically arranged to the ball cage and operatively connected to said cage by a key and slot arrangement so that the controlling element and the cage are coupled for rotation but independent in axial displacement.

4. A ball bearing screw device as defined in claim 1, wherein said controlling element has inclined surfaces abutting against inclined surfaces of the outer and inner member, respectively, said abutting surfaces being relatively inclined to each other so that the angular displacement of said element corresponds to the angular displacement of the freely rolling balls while the axial displacement of said element depends on the relative inclination of said abutting surfaces.

5. A ball bearing screw device as defined in claim 1, wherein said controlling element comprises two separate symmetrical parts, each part having inclined surfaces abutting against inclined surfaces of the outer and inner member, respectively, for operative connection therewith, said abutting surfaces being relatively inclined to each other, said controlling element being coupled with said ball cage for rotation only.

References Cited in the file of this patent

UNITED STATES PATENTS 2,214,493  Trbojerich _____ Sept. 10, 1940

FOREIGN PATENTS 139,400  Switzerland _____ Apr. 15, 1930